US008240192B2

(12) United States Patent
Nakata et al.

(10) Patent No.: US 8,240,192 B2
(45) Date of Patent: Aug. 14, 2012

(54) FUEL TEMPERATURE SENSING DEVICE

(75) Inventors: Kenichiro Nakata, Okazaki (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 286 days.

(21) Appl. No.: 12/817,286

(22) Filed: Jun. 17, 2010

(65) Prior Publication Data

US 2010/0319443 A1 Dec. 23, 2010

(30) Foreign Application Priority Data

Jun. 19, 2009 (JP) ................................ 2009-147012

(51) Int. Cl.
*G01M 15/04* (2006.01)

(52) U.S. Cl. ................................ 73/114.38; 73/114.55

(58) Field of Classification Search ............... 73/114.38, 73/114.43, 114.45, 114.51, 114.55
See application file for complete search history.

(56) References Cited

U.S. PATENT DOCUMENTS

| | | | | |
|---|---|---|---|---|
| 2007/0277786 A1* | 12/2007 | Barnes et al. | ................. | 123/478 |
| 2009/0063013 A1 | 3/2009 | Nakata et al. | | |

FOREIGN PATENT DOCUMENTS

| | | |
|---|---|---|
| JP | H05-281054 | 10/1993 |
| JP | P2003-286888 A | 10/2003 |
| JP | P2005-201070 A | 7/2005 |
| JP | P2005-240581 A | 9/2005 |
| JP | P2009-057924 A | 3/2009 |

OTHER PUBLICATIONS

U.S. Appl. No. 12/797,070, filed Jun. 9, 2010, Yoshida.
U.S. Appl. No. 12/814,777, filed Jun. 14, 2010, Sugiyama et al.
U.S. Appl. No. 12/813,731, filed Jun. 11, 2010, Yamada.
U.S. Appl. No. 12/796,890, filed Jun. 9, 2010, Komatsu.
U.S. Appl. No. 12/796,904, filed Jun. 9, 2010, Sugiyama et al.
U.S. Appl. No. 12/817,266, filed Jun. 17, 2010, Yamada et al.
U.S. Appl. No. 12/796,845, filed Jun. 9, 2010, Takashima.

* cited by examiner

*Primary Examiner* — Eric S McCall
(74) *Attorney, Agent, or Firm* — Nixon & Vanderhye PC

(57) ABSTRACT

A fuel temperature sensing device has fuel temperature sensors provided to respective cylinders for sensing fuel temperature. Each fuel temperature sensor is arranged in a position closer to an injection hole than to a pressure accumulator in a fuel passage extending from the pressure accumulator to the injection hole. The device has an average value calculating section for calculating an average value of fuel temperature sensing values sensed with the fuel temperature sensors of the respective cylinders. The device has a deviation calculating section for calculating deviations between the average value and the fuel temperature sensing values of the respective fuel temperature sensors. The device has a correcting section for correcting the fuel temperature sensing value of each fuel temperature sensor to approximate the deviation to zero for each fuel temperature sensor.

14 Claims, 8 Drawing Sheets

FUEL TEMPERATURE SENSING DEVICE

CROSS REFERENCE TO RELATED APPLICATION

This application is based on and incorporates herein by reference Japanese Patent Application No. 2009-147012 filed on Jun. 19, 2009.

BACKGROUND OF THE INVENTION

1. Field of the Invention

The present invention relates to a fuel temperature sensing device that senses fuel temperature for each cylinder of an internal combustion engine.

2. Description of Related Art

In a conventional common internal combustion engine, a fuel temperature sensor that senses fuel temperature is provided in a discharge port of a pump that supplies fuel to an injector. However, in recent years, it is required to sense the fuel temperature at a position near an injection hole of the injector in some cases. Hereafter, the fuel temperature at a position near the injection hole of the injector will be referred to as INJ fuel temperature. In the above-described construction that senses the fuel temperature in the pump discharge port, the fuel temperature sensor is affected by a heat generated when the fuel is compressed by the pump, and ambient temperature in the discharge port differs from the ambient temperature in the injection hole. Therefore, it is difficult to sense the INJ fuel temperature correctly in such the construction.

The sensing of the INJ fuel temperature is required in a following case, for example. A technology described in Patent document 1 (JP-A-2009-57924) provides fuel pressure sensors for sensing fuel pressure to injectors of respective cylinders. The technology senses a fuel pressure change (fuel pressure waveform) occurring with injection to calculate a change of an actual injection rate (injection rate waveform). Eventually, the technology enables sensing of injection start timing, injection end timing, an injection quantity and the like. However, the above-described fuel pressure waveform turns into different waveforms depending on the fuel temperature (INJ fuel temperature) in the injection hole, from which the fuel is injected then. Therefore, it is required to sense the INJ fuel temperature and to calculate the injection rate waveform by correcting the fuel pressure waveform based on the sensed NJ fuel temperature.

SUMMARY OF THE INVENTION

It is an object of the present invention to provide a fuel temperature sensing device that senses fuel temperature at a position near an injection hole of an injector.

According to a first example aspect of the present invention, a fuel temperature sensing device is applied to an internal combustion engine having injectors provided in respective cylinders for injecting fuel, which is distributed from a pressure accumulator, from injection holes. The fuel temperature sensing device has a plurality of fuel temperature sensors provided to the respective cylinders for sensing fuel temperature. Each of the fuel temperature sensors is arranged in a position closer to the injection hole than to the pressure accumulator in a fuel passage extending from the pressure accumulator to the injection hole. The device has an average value calculating section for calculating an average value of fuel temperature sensing values sensed with the fuel temperature sensors of the respective cylinders. The device has a deviation calculating section for calculating deviations between the average value and the fuel temperature sensing values of the respective fuel temperature sensors. The device has a correcting section for correcting the fuel temperature sensing value of each of the fuel temperature sensors to approximate the deviation to zero for each of the fuel temperature sensors.

According to the above-described aspect of the present invention, the fuel temperature sensor is provided at the position closer to the injection hole than to the pressure accumulator in the fuel passage extending from the pressure accumulator (for example, common rail) to the injection hole. Therefore, the fuel temperature in the injection hole can be sensed more correctly than in the case where the fuel temperature sensor is provided in a discharge port of a pump.

The inventors of the present invention examined providing the fuel temperature sensors to the respective cylinders in this way. The examination revealed that there occurs a variation among the fuel temperature sensing values of the fuel temperature sensors of the respective cylinders. The temperature of the fuel supplied to the injectors of the respective cylinders is the same, and the temperatures in the cylinders are not largely different from each other. Therefore, it is thought that the variation among the fuel temperature sensing values is caused by instrumental error variations of the respective fuel temperature sensors.

Therefore, according to the above-described aspect of the present invention, the average value of the fuel temperature sensing values of the respective cylinders is calculated (by average value calculating section), the deviations between the average value and the fuel temperature sensing values are calculated for the respective fuel temperature sensors (by deviation calculating section), and the fuel temperature sensing values of the respective fuel temperature sensors are corrected to approximate the deviations to zero (by correction section). There is a high possibility that the above-described average value is closer to actual fuel temperature than the fuel temperature sensing value is. Therefore, with the above-described aspect of the present invention that corrects the fuel temperature sensing values to approximate the deviations to zero, the fuel temperature sensing values are corrected to cancel the sensing errors of the fuel temperature sensors resulting from the above-described instrumental error variations. Thus, the fuel temperature at the position close to the injection hole can be sensed with high accuracy.

According to a second example aspect of the present invention, the average value calculating section calculates the average value of the fuel temperature sensing values obtained from the fuel temperature sensors of all the cylinders.

The average value approximates to the actual fuel temperature more as the number of the fuel temperature sensors used for the calculation of the average value increases. Therefore, according to the above-described aspect of the present invention that calculates the average value from the fuel temperature sensing values of all the cylinders, the cancellation of the sensing errors by the correction can be promoted.

The present invention is not limited thereto. Alternatively, for example, according to a third example aspect of the present invention, the fuel temperature sensors are grouped into a plurality of groups, and the average value calculating section calculates the average value of the fuel temperature sensing values for each group.

According to a fourth example aspect of the present invention, the average value calculating section calculates the average value of the fuel temperature sensing values, which are sensed with the plurality of fuel temperature sensors at the same timing.

There is a concern that the actual fuel temperature changes with time. Therefore, according to the above-described aspect of the present invention that calculates the average value using the fuel temperature sensing values sensed at the same timing, inclusion of the change in the actual fuel temperature into the variation among the fuel temperature sensing values can be avoided. Therefore, the cancellation of the sensing errors by the correction can be promoted.

According to a fifth example aspect of the present invention, a fuel temperature sensing device is applied to an internal combustion engine having injectors provided in respective cylinders for injecting fuel, which is distributed from a pressure accumulator, from injection holes. The fuel temperature sensing device has a plurality of fuel temperature sensors provided to the respective cylinders for sensing fuel temperature. Each of the fuel temperature sensors is arranged in a position closer to the injection hole than to the pressure accumulator in a fuel passage extending from the pressure accumulator to the injection hole. The device has a trend calculating section for calculating a trend waveform showing a tendency of a temporal transition of fuel temperature sensing values sensed with the fuel temperature sensors. The device has a deviation calculating section for calculating a deviation between the trend waveform and the fuel temperature sensing value for each of the fuel temperature sensors. The device has a correcting section for correcting the fuel temperature sensing value to approximate the fuel temperature sensing value to the trend waveform for each of the fuel temperature sensors.

According to the above-described aspect of the present invention, the fuel temperature sensor is provided at the position closer to the injection hole than to the pressure accumulator (such as common rail) in the fuel passage extending from the pressure accumulator to the injection hole. Therefore, the fuel temperature in the injection hole can be sensed more correctly than in the case where the fuel temperature sensor is provided in a discharge port of a pump.

According to the above-described aspect of the present invention, the trend waveform showing the tendency of the temporal transition of the fuel temperature sensing values is calculated (by trend calculating section), the deviation between the trend waveform and the fuel temperature sensing value is calculated for each fuel temperature sensor (by deviation calculating section), and the fuel temperature sensing value is corrected for each fuel temperature sensor to approximate the fuel temperature sensing value to the trend waveform (by correcting section). There is a high possibility that the fuel temperature based on the above-described trend waveform is closer to actual fuel temperature than the fuel temperature sensing value is. Therefore, with the above-described aspect of the present invention that corrects the fuel temperature sensing value to approximate the fuel temperature sensing value to the trend waveform, the fuel temperature sensing value is corrected to cancel the sensing error of the fuel temperature sensor resulting from the instrumental error variation mentioned above. Thus, the fuel temperature at the position close to the injection hole can be sensed with high accuracy.

According to a sixth example aspect of the present invention, the trend calculating section calculates the trend waveform by using the fuel temperature sensing values obtained from the fuel temperature sensors of all the cylinders.

The fuel temperature based on the trend waveform approximates to the actual fuel temperature more as the number of the fuel temperature sensors used for the calculation of the trend waveform increases. Therefore, according to the above-described aspect of the present invention that calculates the trend waveform from the fuel temperature sensing values of all the cylinders, the cancellation of the sensing error by the correction can be promoted.

The present invention is not limited thereto. Alternatively, for example, according to a seventh example aspect of the present invention, the fuel temperature sensors are grouped into a plurality of groups, and the trend calculating section calculates the trend waveform of the fuel temperature sensing values for each group.

According to an eighth example aspect of the present invention, the fuel temperature sensing values used for calculating the trend waveform are sequentially obtained from the plurality of fuel temperature sensors.

For example, when the instrumental error variation of the fuel temperature sensor of one of the four cylinders is larger than the instrumental error variations of the other fuel temperature sensors, there is a possibility that the fuel temperature sensing value of the fuel temperature sensor having the large instrumental error variation is obtained successively unless the fuel temperature sensing values are obtained from the multiple fuel temperature sensors sequentially as in the above-described aspect of the present invention. In this case, the trend waveform cannot be approximated to the actual fuel temperature change sufficiently. As contrasted thereto, according to the above-described aspect of the present invention, the multiple fuel temperature sensing values used for the calculation of the trend waveform are sequentially obtained from the multiple fuel temperature sensors. Therefore, the possibility of the succession of the fuel temperature sensing values containing the large instrumental error variations can be reduced. Therefore, the trend waveform can be sufficiently approximated to the actual fuel temperature change.

According to a ninth example aspect of the present invention, the fuel temperature sensing device further has a determining section for determining that certain one of the fuel temperature sensors is abnormal when the deviation of the certain one of the fuel temperature sensors is equal to or larger than a predetermined value. With such the construction, the abnormality of the fuel temperature sensor can be determined easily.

According to a tenth example aspect of the present invention, the fuel temperature sensing device further has a learning section for learning a correction amount used by the correcting section during a stoppage of the internal combustion engine having the injectors.

The fuel does not flow through the fuel passage during the stoppage of the internal combustion engine. Therefore, the fuel temperature is in a steady state, in which the change in the fuel temperature is small, during the stoppage of the internal combustion engine. Therefore, according to the above-described aspect of the present invention that performs the learning of the correction amount while the fuel temperature is in the steady state, the learning accuracy of the correction amount can be improved.

According to an eleventh example aspect of the present invention, the internal combustion engine having the injectors is mounted in a vehicle, and the learning section performs the learning of the correction amount, which is used by the correcting section, for each predetermined travel distance of the vehicle.

The change of the fuel temperature is slower than the change of the fuel pressure. Therefore, in order to inhibit the excessively frequent learning of the correction amount, it is desirable to perform the learning for each predetermined travel distance of the vehicle, so a processing load necessary for the learning is reduced.

According to a twelfth example aspect of the present invention, a fuel temperature sensing device is applied to an internal combustion engine having injectors provided in respective cylinders for injecting fuel, which is distributed from a pressure accumulator, from injection holes. The fuel temperature sensing device has a plurality of fuel pressure sensors provided to the respective cylinders for sensing fuel pressure. Each of the fuel pressure sensors is arranged in a position closer to the injection hole than to the pressure accumulator in a fuel passage extending from the pressure accumulator to the injection hole. The device has a fuel pressure average value calculating section for calculating an average value of fuel pressure sensing values, which are sensed with the fuel pressure sensors of the respective cylinders when the fuel is not injected. The device has a deviation calculating section for calculating a temperature deviation amount between fuel temperature of specific one of the cylinders and average fuel temperature of all the cylinders based on a fuel pressure sensing value deviation amount between the fuel pressure sensing value of the specific one of the cylinders and the average value.

The actual fuel pressure at the time when the fuel is not injected should be the same in all the cylinders. However, the fuel pressure sensor has a temperature characteristic. Therefore, even if the fuel pressure is the same, the fuel pressure sensing value takes different values depending on the fuel temperature at that time. According to the above-described aspect of the present invention taking this point into account, the average value of the fuel pressure sensing values at the time when the fuel is not injected is calculated (by fuel pressure average value calculating section), and the temperature deviation amount between the fuel temperature of the specific cylinder and the average fuel temperature of all the cylinders is calculated based on the fuel pressure sensing value deviation amount between the fuel pressure sensing value of the specific cylinder and the average value.

That is, if the fuel temperatures of the respective cylinders are the same, there should be no deviation between the average value of the fuel pressure sensing values and the fuel pressure sensing value of the specific cylinder when the fuel is not injected. Therefore, when the deviation occurs, it is thought that the deviation is caused by the difference among the fuel temperatures of the cylinders. Therefore, the temperature deviation amount between the fuel temperature of the specific cylinder and the average fuel temperature of all the cylinders can be calculated based on the above-described fuel pressure sensing value deviation amount. Therefore, according to the above-described aspect of the present invention, the temperature deviation amount can be calculated without using the fuel temperature sensors.

According to a thirteenth example aspect of the present invention, the fuel temperature sensing device further has a determining section for determining that the fuel pressure sensor provided in the specific one of the cylinders is abnormal when the fuel pressure sensing value deviation amount is equal to or larger than a predetermined value. With such the construction, the abnormality of the fuel pressure sensor can be determined easily.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
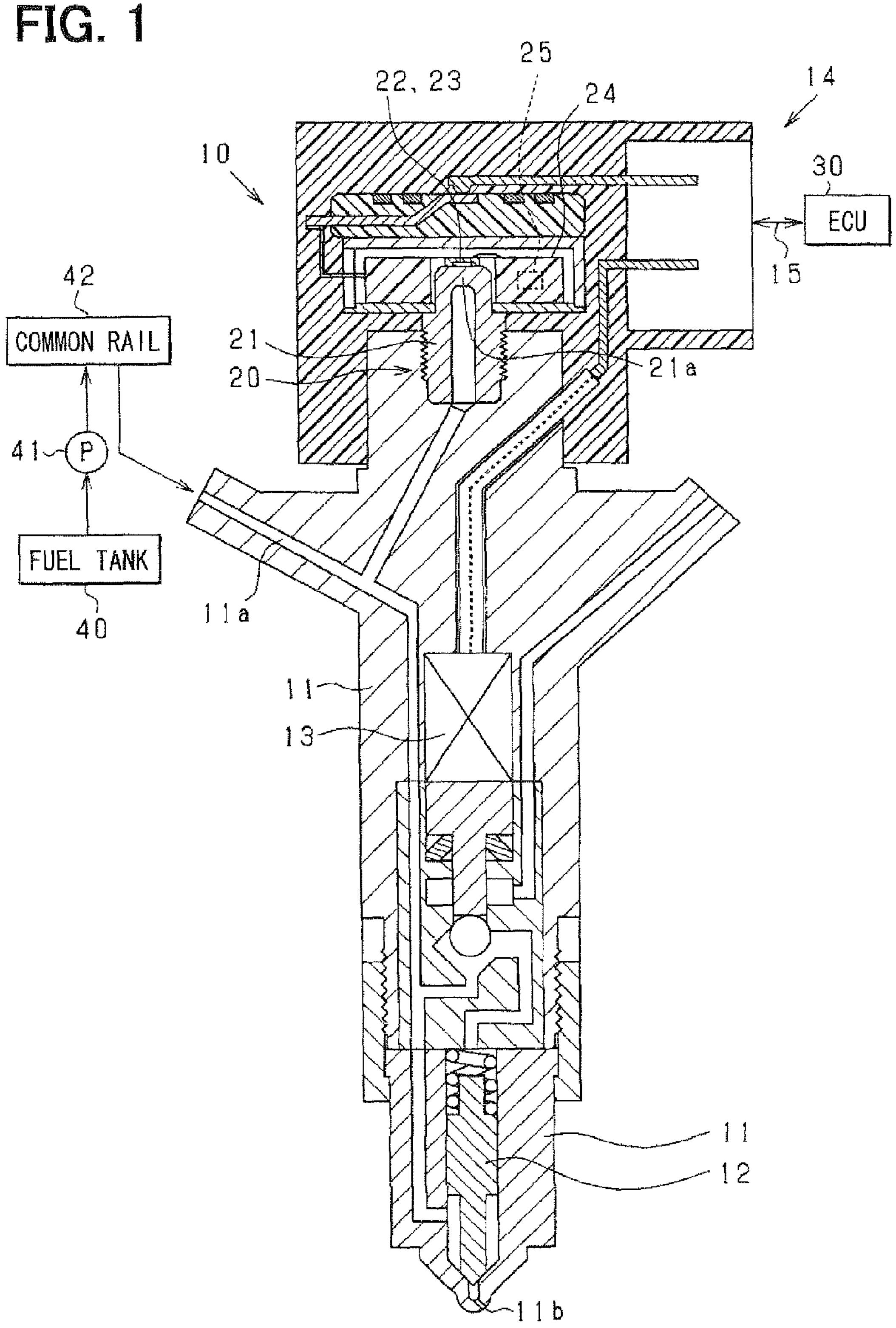
FIG. 1 is a diagram schematically showing a fuel injection system having a fuel temperature sensing device according to a first embodiment of the present invention.

Hereafter, embodiments of the present invention will be described with reference to the drawings. In the following description of the respective embodiments, the same sign is used in the drawings for identical or equivalent parts.

First Embodiment

A fuel temperature sensing device according to a first embodiment is mounted in an engine (internal combustion engine) for a vehicle. A diesel engine that injects high-pressure fuel and causes compression self-ignition combustion of the fuel in multiple cylinders #1 to #4 is assumed as the engine.

FIG. 1 is a schematic diagram showing an injector 10 mounted in each cylinder of the engine, a sensor device 20 mounted in the injector 10, an electronic control unit 30 (ECU) mounted in the vehicle and the like.

First, a fuel injection system of the engine including the injector 10 will be explained. The fuel in a fuel tank 40 is suctioned by a high-pressure pump 41 and is pumped to a common rail 42 (pressure accumulator). The fuel accumulated in the common rail 42 is distributed and supplied to the injectors 10 of the respective cylinders.

The injector 10 has a body 11, a needle 12 (valve member), an actuator 13 and the like as explained below. The body 11 defines a high-pressure passage 11*a* (fuel passage) inside and an injection hole 11*b* for injecting the fuel. The needle 12 is accommodated in the body 11 and opens and closes the injection hole 11*b*. The actuator 13 causes the needle 12 to perform the opening-closing operation.

The ECU 30 controls drive of the actuator 13 to control the opening-closing operation of the needle 12. Thus, the high-pressure fuel supplied from the common rail 42 to the high-pressure passage 11*a* is injected from the injection hole 11*b* in accordance with the opening-closing operation of the needle 12. For example, the ECU 30 calculates injection modes such as injection start timing, injection end timing and an injection quantity based on rotation speed of an engine output shaft, an engine load and the like. The ECU 30 controls the drive of the actuator 13 to realize the calculated injection modes.

Next, a hardware construction of the sensor device 20 will be explained.

The sensor device 20 has a stem 21 (strain element), a fuel pressure sensor 22, a fuel temperature sensor 23, a mold IC 24 and the like as explained below. The stem 21 is fixed to the body 11. A diaphragm section 21*a* formed in the stem 21 receives pressure of the high-pressure fuel flowing through the high-pressure passage 11*a* and deforms elastically.

The fuel pressure sensor 22 has a bridge circuit including a pressure-sensitive resistive element fixed to the diaphragm section 21*a*. A resistance of the pressure-sensitive resistive element changes in accordance with a strain amount of the stem 21, i.e., the pressure of the high-pressure fuel (fuel pressure). Thus, the bridge circuit (fuel pressure sensor 22) outputs a fuel pressure sensing signal (fuel pressure sensing value) corresponding to the fuel pressure.

The fuel temperature sensor 23 has a bridge circuit including a temperature-sensitive resistive element fixed to the diaphragm section 21*a*. A resistance of the temperature-sensitive resistive element changes in accordance with temperature of the stem 21 that changes depending on temperature of the fuel (fuel temperature). Thus, the bridge circuit (fuel temperature sensor 23) outputs a fuel temperature sensing signal (fuel temperature sensing value) corresponding to the fuel temperature.

The mold IC 24 is mounted in the injector 10 together with the stem 21. The mold IC 24 is formed by molding electronic components 25 such as an amplifying circuit that amplifies the fuel pressure sensing signal and the fuel temperature sensing signal, a power supply circuit that applies voltages to the bridge circuits of the fuel pressure sensor 22 and the fuel temperature sensor 23 and a memory with a resin. A connector 14 is provided in an upper portion of the body 11. The mold IC 24 and the ECU 30 are electrically connected through a harness 15 connected to the connector 14. The harness 15 includes a power line for supplying a power to the actuator 13, a communication line 15*a* and a signal line 15*b* explained later with reference to FIG. 3 and the like.

The sensor device 20 is mounted to each of the injectors 10 of the respective cylinders. The fuel pressure sensing signals and the fuel temperature sensing signals are inputted from the sensor devices 20 to the ECU 30. The fuel pressure sensing signal changes depending on not only the fuel pressure but also sensor temperature (fuel temperature). That is, even in the case where the actual fuel pressure is the same, the fuel pressure sensing signal takes different values if the temperature of the fuel pressure sensor 22 at that time differs. In view of this point, the ECU 30 performs temperature compensation by correcting the obtained fuel pressure based on the obtained fuel temperature. Hereafter, the fuel pressure having undergone the temperature compensation in this way will be simply referred to as the sensed pressure. Further, the ECU 30 performs processing for calculating the injection modes such as the injection start timing, the injection time and the injection quantity of the fuel injected from the injection hole 11*b* by using the sensed pressure calculated in this way.

Next, a calculation method of the injection modes will be explained with reference to FIG. 2.

Figure 2:
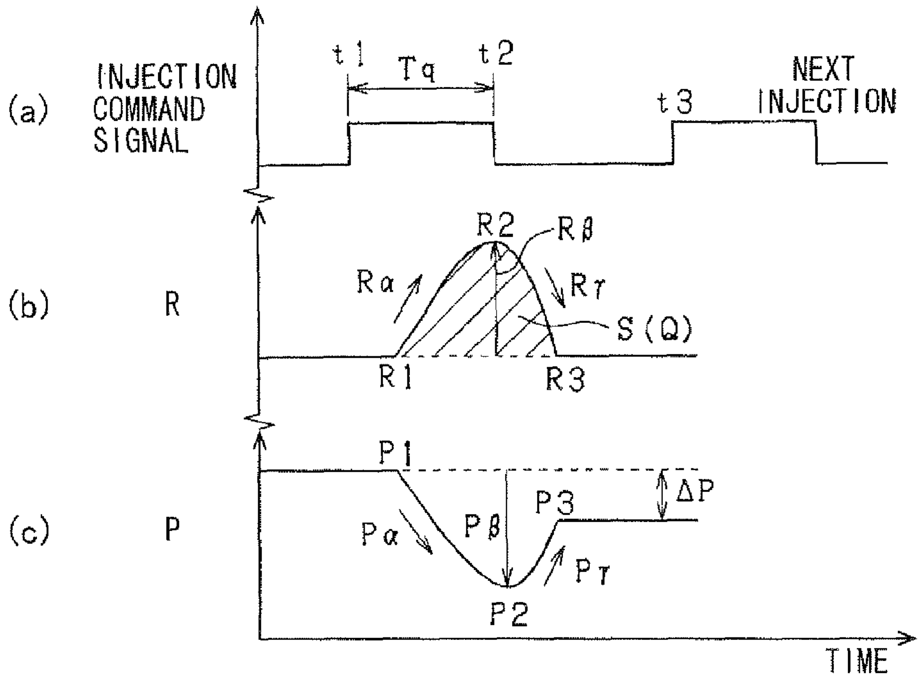
FIG. 2 is a time chart showing an injection command signal, an injection rate and sensed pressure according to the first embodiment.

Part (a) of FIG. 2 shows an injection command signal outputted from the ECU 30 to the actuator 13 of the injector 10. Due to pulse-on of the command signal, the actuator 13 operates and the injection hole 11*b* opens. That is, an injection start is commanded at pulse-on timing t1 of the injection command signal, and an injection end is commanded at pulse-off timing t2. Therefore, the injection quantity Q is controlled by controlling a valve opening time Tq of the injection hole 11*b* with a pulse-on period of the command signal (i.e., injection command period).

Part (b) of FIG. 2 shows change (transition) of a fuel injection rate R of the fuel from the injection hole 11*b* occurring with the above-described injection command. Part (c) of FIG. 2 shows change (fluctuation waveform) of the sensed pressure P occurring with the change of the injection rate R. There is a correlation between the fluctuation of the sensed pressure P and the change of the injection rate R as explained below. Therefore, a transition waveform of the injection rate R can be estimated from the fluctuation waveform of the sensed pressure P.

That is, after the timing t1 when the injection start command is outputted as shown in part (a) of FIG. 2, the injection rate R starts increasing at timing R1 and the injection is started. As the injection rate R starts increasing at the timing R1, the sensed pressure P starts decreasing at a changing point P1. Then, as the injection rate R reaches the maximum injection rate at timing R2, the decrease of the sensed pressure P stops at a changing point P2. Then, as the injection rate R starts decreasing at timing R2, the sensed pressure P starts increasing at the changing point P2. Then, as the injection rate R becomes zero and the actual injection ends at timing R3, the increase of the sensed pressure P stops at a changing point P3.

Thus, by detecting the changing points P1 and P3 in the fluctuation of the sensed pressure P, the increase start timing R1 (actual injection start timing) and the decrease end timing R3 (actual injection end timing) of the injection rate R correlated with the changing points P1, P3 can be calculated. In addition, by sensing a pressure decrease rate Pα, a pressure increase rate Pγ and a pressure decrease amount Pβ from the fluctuation of the sensed pressure P, an injection rate increase rate Rα, an injection rate decrease rate Rγ and an injection rate increase amount R3 correlated with the values Pα, Pγ, Pβ can be calculated.

An integration value of the injection rate R from the actual injection start to the actual injection end (i.e., area of shaded portion S shown in part (b) of FIG. 2) corresponds to the injection quantity Q. An integration value of the pressure P in a portion of the fluctuation waveform of the sensed pressure P corresponding to the change of the injection rate R from the actual injection start to the actual injection end (i.e., portion from changing point P1 to changing point P3) is correlated with the integration value S of the injection rate R. Therefore, the injection rate integration value S equivalent to the injection quantity Q can be calculated by calculating the pressure integration value from the fluctuation of the sensed pressure P.

Figure 3:
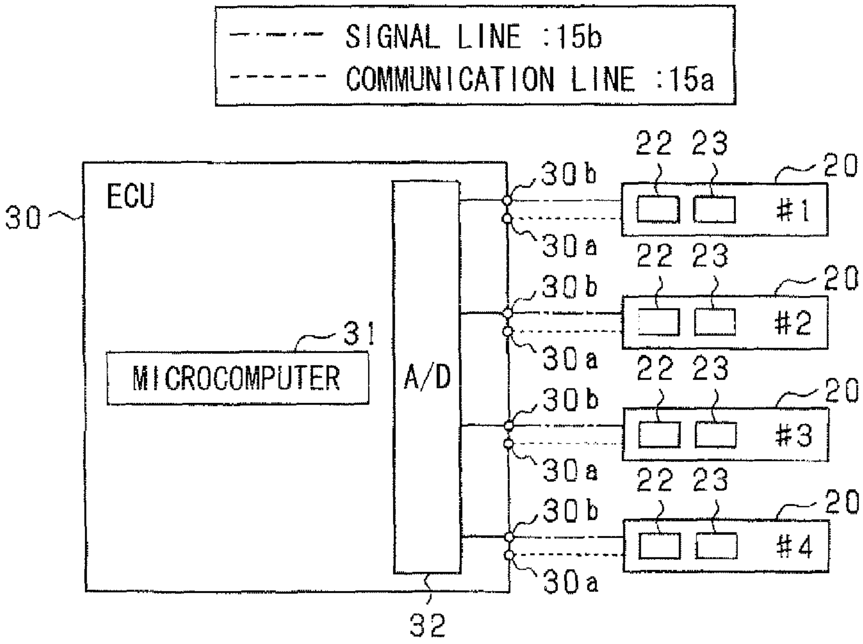
FIG. 3 is a diagram showing a connection structure between sensor devices provided to multiple cylinders and an ECU according to the first embodiment.

FIG. 3 is a diagram showing a circuit configuration of the ECU 30 and connection structure between the sensor devices 20 provided in the respective cylinders #1 to #4 and the ECU 30. As shown in FIG. 3, the multiple sensor devices 20 are connected to the single ECU 30. The communication line 15*a* and the signal line 15*b* are provided for each sensor device 20. The communication lines 15*a* and the signal lines 15*b* connected to the multiple sensor devices 20 are connected to multiple communication ports 30*a* and signal ports 30*b* of the ECU 30 respectively.

The ECU 30 has a microcomputer 31 that has CPU, a memory and the like, a communication circuit and an AD conversion circuit 32. The microcomputer 31 decides switching between the fuel pressure sensing signal and the fuel temperature sensing signal. A switching command signal based on the decision is transmitted from the ECU 30 to each sensor device 20. The switching command signal is a digital signal and is transmitted as a bit string through the communication line 15*a*.

The sensor device 20 selects either the fuel pressure sensing signal or the fuel temperature sensing signal based on the switching command signal. The sensor device 20 transmits the selected sensing signal to the ECU 30 through the signal line 15*b* in the form of an analog signal as it is. The transmitted fuel pressure sensing signal or fuel temperature sensing signal is converted from the analog signal into a digital signal by the AD conversion circuit 32 of the ECU 30 and is inputted to the microcomputer 31.

If the sensor device 20 executes the output switching of the sensing signal based on the switching command signal, the sensor device 20 transmits a response signal to the ECU 30 through the communication line 15*a* at the timing of the start of the execution. Thus, the microcomputer 31 can recognize the switching timing of the sensing signal. Accordingly, the microcomputer 31 can correctly recognize the received sensing signal by dividing the received sensing signal into the fuel pressure sensing signal and the fuel temperature sensing signal.

Since the communication line 15*a* is required to transmit the switching command signal and the response signal as described above, the communication line 15*a* is constructed to be able to perform two-way communication. The signal line 15*b* is constructed to be able to perform one-way transmission from the sensor device 20 to the ECU 30.

The sensor device 20 is switched to a state for outputting the fuel pressure sensing signal while the injector 10 performs a valve opening operation and injects the fuel. Thus, the fluctuation waveform of the fuel pressure P occurring during the fuel injection period (refer to part (c) of FIG. 2) is obtained to estimate the change of the injection rate R. Therefore, the switching from the fuel pressure sensing signal to the fuel temperature sensing signal is prohibited while the fuel is injected.

Thus, the microcomputer 31 of the ECU 30 can obtain the fuel pressure and the fuel temperature of the injector 10 of each of the cylinders #1 to #4.

A variation occurs among the fuel temperature sensing signals (fuel temperature sensing values) outputted from the fuel temperature sensors 23 of the cylinders #1 to #4. It is thought that the actual fuel temperatures of the cylinders #1 to #4 are substantially the same. Therefore, it is thought that the variation among the fuel temperature sensing values is caused by instrumental error variations of the respective fuel temperature sensors 23.

Figure 4A:
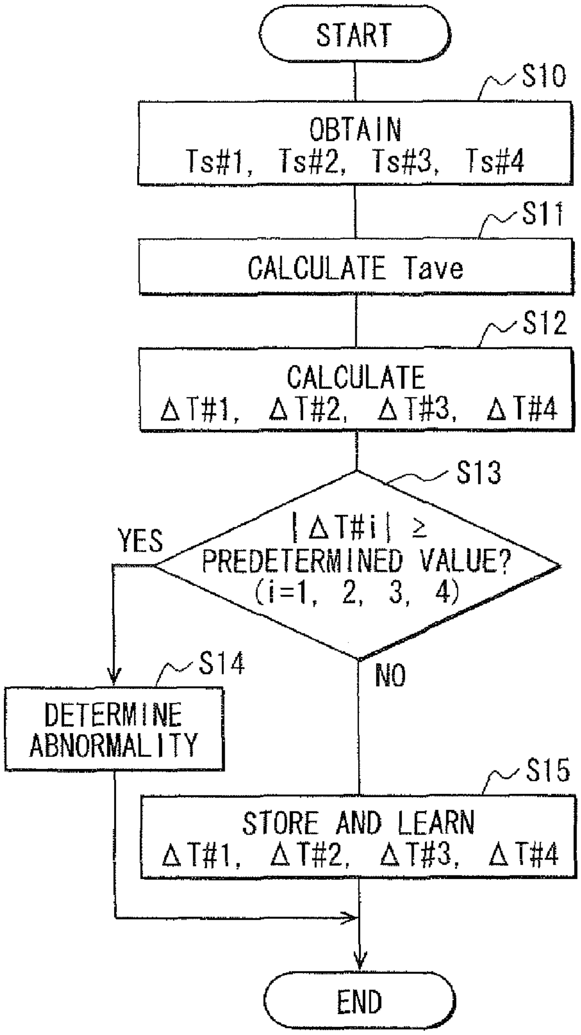
FIG. 4A is a flowchart showing a procedure of learning processing according to the first embodiment.
Figure 4B:
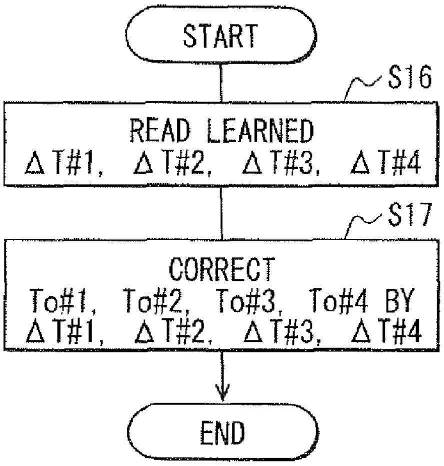
FIG. 4B is a flowchart showing a procedure of correction using a learning value according to the first embodiment.

Therefore, in the present embodiment, the microcomputer 31 performs processing shown in FIGS. 4A and 4B. Thus, the microcomputer 31 performs correction of the fuel temperature sensing values to cancel the instrumental error variations.

First in S10 (S means "Step"), the fuel temperature sensing values Ts#1, Ts#2, Ts#3, Ts#4 outputted from the respective fuel temperature sensors 23 of all the cylinders #1 to #4 are obtained. The values transmitted through the signal lines 15*b* at the same timing are used as the fuel temperature sensing values Ts#1 to Ts#4. It is preferable to use the values transmitted while none of the injectors 10 of the cylinders injects the fuel (for example, immediately after ignition switch is switched on).

In following S11 (average value calculating section), an average value Tave of all the obtained fuel temperature sensing values Ts#1 to Ts#4 is calculated. In following S12 (deviation calculating section), differences ΔT#1, ΔT#2, ΔT#3, ΔT#4 between the average value Tave calculated in S11 and the fuel temperature sensing values Ts#1 to Ts#4 obtained in S10 are calculated. For example, ΔT#1=Tave−Ts#1. The differences ΔT#1 to ΔT#4 correspond to deviations and also to correction amounts.

In following S13 (abnormality determining section), it is determined whether an absolute value of each of the differences ΔT#1 to ΔT#4 calculated in S12 is "equal to or larger than" a predetermined value, which is set beforehand. If the absolute value of the difference is equal to or larger than the predetermined value, a diagnostic signal indicating that the fuel temperature sensor 23 of the corresponding cylinder is abnormal is outputted in following S14.

If the absolute value of the difference is smaller than the predetermined value, the processing proceeds to S15 (learning section). In S15, the differences ΔT#1 to ΔT#4 calculated in S12 are stored and updated in a memory such as EEPROM of the ECU 30, thereby learning the differences ΔT#1 to ΔT#4.

A series of the above-described processing of FIG. 4A is learning processing performed once or several times when none of the injectors 10 of the cylinders injects the fuel (for example, immediately after occupant switches on ignition switch). The processing of FIG. 4B is repeatedly performed in a predetermined cycle (for example, computation cycle of CPU of microcomputer 31) while the internal combustion engine is operated.

First in S16 of FIG. 4B, the learning values (differences ΔT#1 to ΔT#4) stored and updated by the above-described learning processing are read. In following S17 (correcting section), the fuel temperature sensing values To#1 to To#4 transmitted sequentially through the signal lines 15*b* are corrected based on the read differences ΔT#1 to ΔT#4. For example, the fuel temperature sensing value T#1 after the correction is calculated by a formula: T#1=To#1−ΔT#1. Also the other fuel temperature sensing values T#2 to T#4 are calculated by the similar correction.

The fuel temperature sensing values T#1 to T#4 corrected by the above processing are used for performing the above-mentioned temperature compensation and for calculating the injection rate waveform of part (b) of FIG. 2 from the fuel pressure waveform of part (c) of FIG. 2. Since the fuel pressure waveform turns into different waveforms depending on the fuel temperature (INJ fuel temperature) in the injection hole 11*b* injecting the fuel at that time, it is required to calculate the injection rate waveform by correcting the fuel pressure waveform based on the INJ fuel temperature. The corrected fuel temperature sensing values T#1 to T#4 are used as the INJ fuel temperatures.

The present embodiment described above exerts following effects.

(1) In the present embodiment, the fuel temperature sensor 23 is provided at the position closer to the injection hole 11*b* than to the common rail 42 in the fuel passage extending from the common rail 42 to the injection hole 11*b*. More specifically, the fuel temperature sensor 23 is provided inside the injector 10. Therefore, the fuel temperature in the injection hole 11*b* can be sensed more correctly than in the case where the fuel temperature sensor is provided in the discharge port of the high-pressure pump 41. Therefore, according to the present embodiment performing the temperature compensation of the pressure sensing values and the calculation of the injection rate waveform using the fuel temperature sensing values sensed with such the fuel temperature sensors 23, the injection control using such the temperature compensation or the injection rate waveform calculation can be performed with high accuracy.

(2) The average value Tave of the fuel temperature sensing values Ts#1 to Ts#4 of the cylinders is calculated and the differences ΔT#1 to ΔT#4 between the fuel temperature sensing values Ts#1 to Ts#4 and the average value Tave are calculated. The fuel temperature sensing values To#1 to To#4 sequentially transmitted through the signal lines 15*b* are corrected based on the differences ΔT#1 to ΔT#4 (learning values). Thus, the fuel temperature at the position close to the injection hole 11*b* can be sensed with high accuracy, and eventually the injection control can be performed with high accuracy.

(3) The average value Tave approximates to the actual fuel temperature more as the number of the fuel temperature sensors 23 used for the calculation of the average value Tave increases. Therefore, according to the present embodiment calculating the average value Tave from the fuel temperature sensing values Ts#1 to Ts#4 obtained from all the fuel temperature sensors 23 (#1 to #4), the fuel temperature sensing values To#1 to To#4 transmitted sequentially through the signal lines 15*b* can be corrected with the high accuracy.

(4) The values transmitted through the signal lines 15*b* at the same timing are used as the fuel temperature sensing values Ts#1 to Ts#4 used for the calculation of the average value Tave. Therefore, inclusion of the change in the actual fuel temperature into the variation among the fuel temperature sensing values Ts#1 to Ts#4 can be prevented. Therefore, the differences ΔT#1 to ΔT#4 used for the correction can be calculated with high accuracy.

(5) Among the multiple fuel temperature sensors 23 (#1 to #4), the fuel temperature sensor corresponding to the difference (among differences ΔT#1 to ΔT#4), the absolute value of which is equal to or larger than the predetermined value, is determined to be abnormal. In this way, the abnormality of the fuel temperature sensor 23 is determined using the differences ΔT#1 to ΔT#4 used for the correction. Therefore, the abnormality can be determined easily.

(6) The fuel does not flow through the high-pressure passage 11*a* when the high-pressure passage 11*a* is filled with the fuel because the fuel is discharged from the high-pressure pump 41 and the fuel injection is not performed. In such the case, the fuel temperature is in a steady state, in which the change in the fuel temperature is small. According to the present embodiment learning the differences ΔT#1 to ΔT#4 when the fuel temperature is in the steady state, the learning accuracy can be improved.

Second Embodiment

Next, a second embodiment of the present invention will be described.

Figure 5:
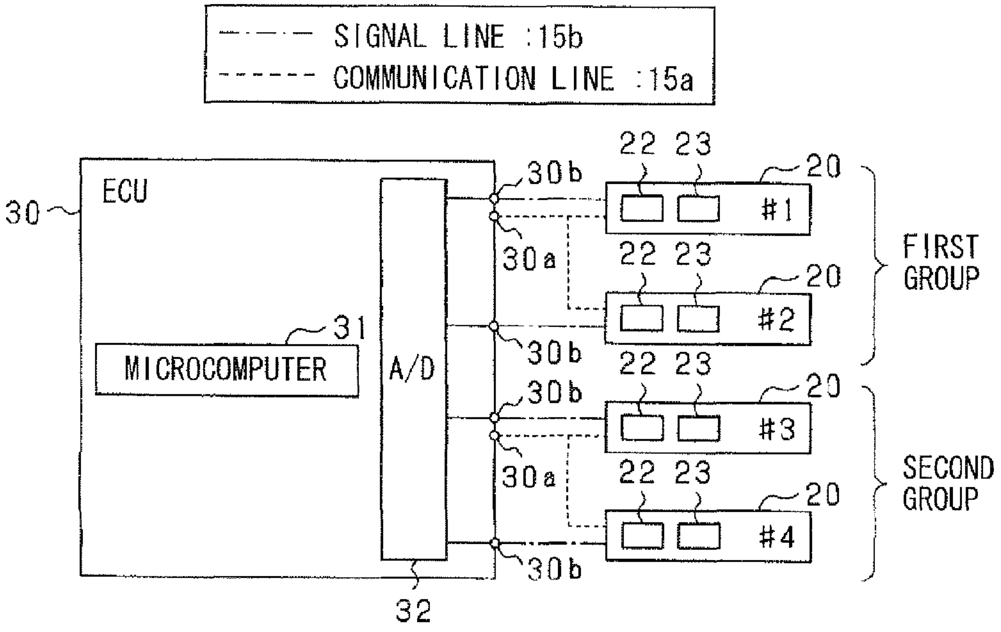
FIG. 5 is a diagram showing a connection structure between sensor devices provided to multiple cylinders and an ECU in a fuel temperature sensing device according to a second embodiment of the present invention.

In the above-described first embodiment, the communication lines 15*a* connected to the multiple sensor devices 20 respectively are connected to the multiple communication ports 30*a* of the ECU 30 respectively as shown in FIG. 3. Regarding this point, in the second embodiment shown in FIG. 5, multiple communication lines 15*a* are connected to a single communication port 30*a* to share a part of the communication line 15*a* among the multiple sensor devices 20. Thus, the number of the necessary communication ports 30*a* of the ECU 30 is reduced.

Accordingly, a common switching command signal is transmitted from the ECU 30 to the multiple sensor devices 20 (#1, #2) corresponding to a first group sharing a part of the communication line 15*a* through the communication port 30*a*. A common switching command signal is transmitted from the ECU 30 to the multiple sensor devices 20 (#3, #4) corresponding to a second group sharing a part of the communication line 15*a* through the communication port 30*a*. Therefore, the signals of the multiple sensor devices 20 corresponding to the first group are switched at the same time between the pressure sensing signals and the temperature sensing signals and the same kind of signals out of the pressure sensing signals and the temperature sensing signals are transmitted from the multiple sensor devices 20 corresponding to the first group. Likewise, the signals of the multiple sensor devices 20 corresponding to the second group are switched at the same time between the pressure sensing signals and the temperature sensing signals and the same kind of signals out of the pressure sensing signals and the temperature sensing signals are transmitted from the multiple sensor devices 20 corresponding to the second group.

In the present embodiment grouping the multiple sensor devices 20 in this way, each of average values Tave1 and Tave2 of the fuel temperature sensing values Ts#1 to Ts#4 is calculated and corrected for each group.

Details thereof will be explained below with reference to FIG. 6. First in S20, the fuel temperature sensing values Ts#1, Ts#2, Ts#3, Ts#4 outputted from the respective fuel temperature sensors 23 are obtained for each group. The values transmitted through the signal lines 15*b* at the same timing are used as the fuel temperature sensing values Ts#1 to Ts#4. It is preferable to use the values transmitted when none of the injectors 10 of the cylinders injects the fuel (for example, immediately after ignition switch is switched on).

In following S21 (average value calculating section), each of the average values Tave1, Tave2 of the obtained fuel temperature sensing values Ts#1 to Ts#4 is calculated for each group. That is, the average value Tave1 of the fuel temperature sensing values Ts#1 and Ts#2 is calculated for the first group, and the average value Tave2 of the fuel temperature sensing values Ts#3 and Ts#4 is calculated for the second group.

In following S22 (deviation calculating section), differences ΔT#1, ΔT#2, ΔT#3, ΔT#4 between the average values Tave1 and Tave2 calculated in S21 and the fuel temperature sensing values Ts#1 to Ts#4 obtained in S20 are calculated (i.e., ΔT#1=Tave1−Ts#1, ΔT#2=Tave1−Ts#2, ΔT#3=Tave2−Ts#3, ΔT#4=Tave2−Ts#4). The differences ΔT#1 to ΔT#4 correspond to deviations and also to correction amounts.

In following S23 (abnormality determining section), it is determined whether an absolute value of each of the differences ΔT#1 to ΔT#4 calculated in S22 is "equal to or larger than" a predetermined value, which is set beforehand. If the absolute value of the difference is equal to or larger than the predetermined value, a diagnostic signal indicating that the fuel temperature sensor 23 of the corresponding cylinder is abnormal is outputted in following S24.

If the absolute value of the difference is smaller than the predetermined value, the processing proceeds to S35 (learning section). In S35, the differences ΔT#1 to ΔT#4 calculated in S32 are stored and updated in a memory such as EEPROM of the ECU 30, thereby learning the differences ΔT#1 to ΔT#4.

Figure 6:
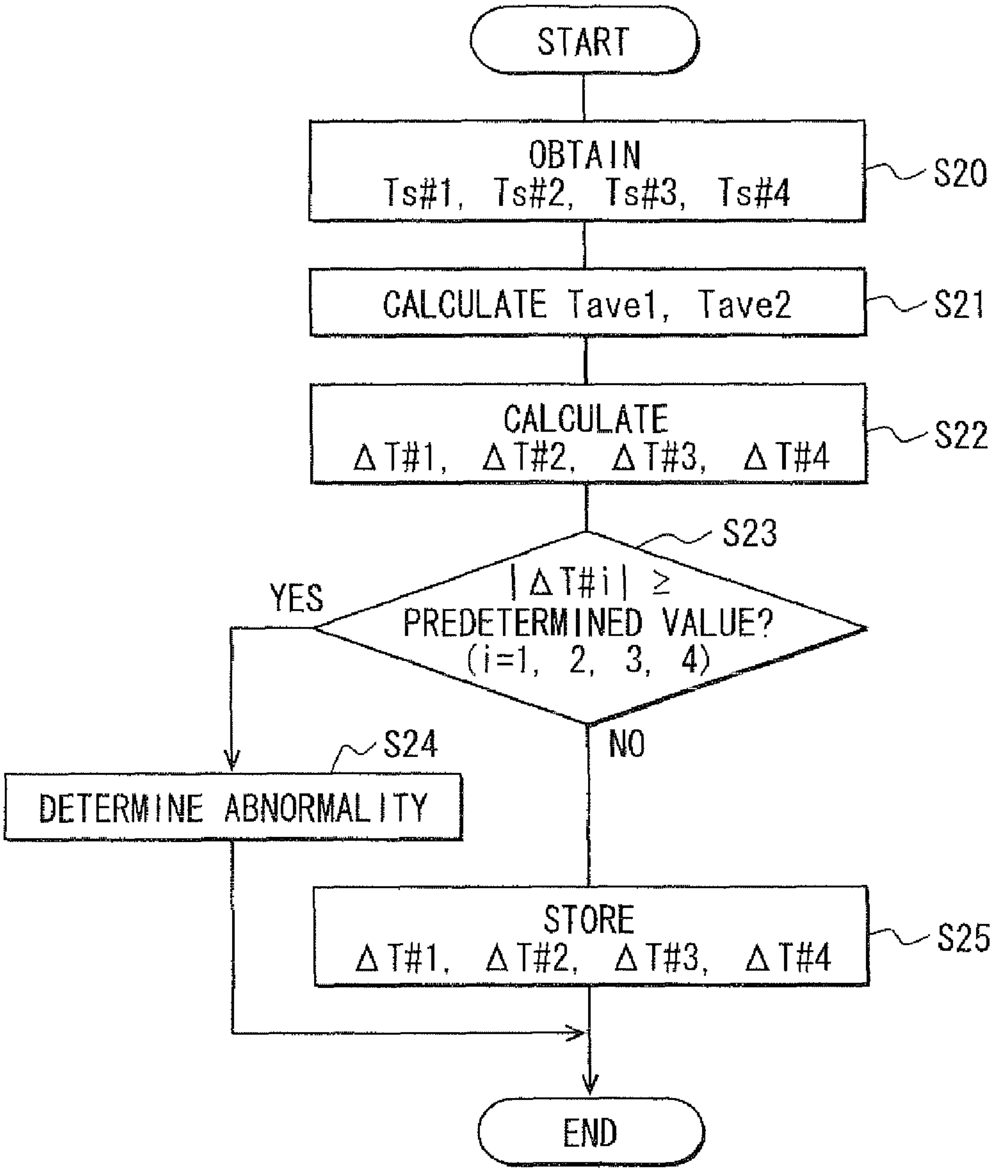
FIG. 6 is a flowchart showing a procedure of learning processing according to the second embodiment.

A series of the above-described processing of FIG. 6 is learning processing performed once or several times when none of the injectors 10 of the cylinders injects the fuel (for example, immediately after occupant switches on ignition switch). Processing similar to the processing shown in FIG. 4B of the above-described first embodiment is performed using the learning values obtained by the learning processing of FIG. 6. Thus, the fuel temperature sensing values To#1 to To#4 transmitted sequentially through the signal lines 15*b* are corrected.

Thus, effects similar to the effects (1), (2) and (4) to (6) of the first embodiment can be exerted also by the second embodiment explained above.

Third Embodiment

Next, a third embodiment of the present invention will be described.

In the above-described first embodiment, the average value Tave of the fuel temperature sensing values Ts#1 to Ts#4 of the respective cylinders is calculated, and the fuel temperature sensing values To#1 to To#4 transmitted sequentially through the signal lines 15*b* are corrected based on the differences ΔT#1 to ΔT#4 between the fuel temperature sensing values Ts#1 to Ts#4 and the average value Tave. In the present embodiment, a trend waveform (refer to FIG. 8A) showing a tendency of a temporal transition of the fuel temperature sensing values To#1 to To#4 transmitted sequentially through the signal lines 15*b* is calculated. Then, the fuel temperature sensing values To#1 to To#4 are corrected based on deviation width ΔT (refer to FIG. 8B) of the fuel temperature sensing values To#1 to To#4 from the trend waveform.

Figure 7A:
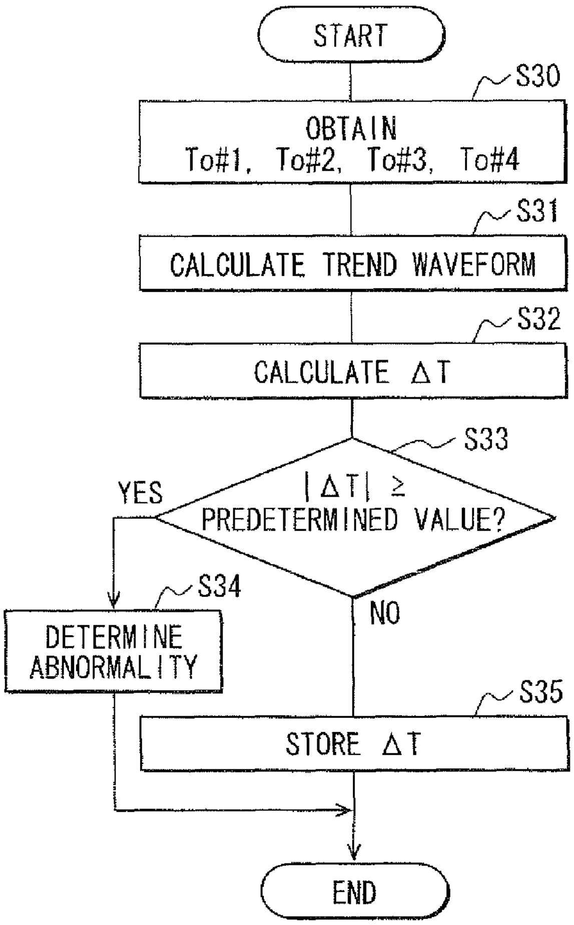
FIG. 7A is a flowchart showing a procedure of learning processing according to a third embodiment of the present invention.
Figure 7B:
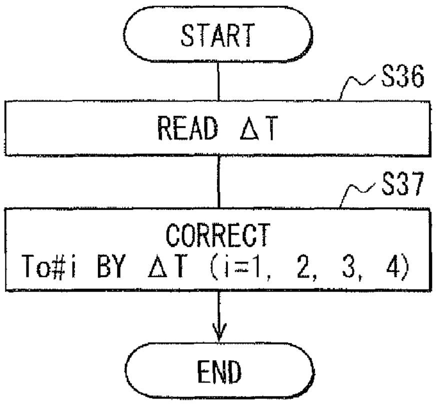
FIG. 7B is a flowchart showing a procedure of correction using a learning value according to the third embodiment.

FIGS. 7A and 7B are flowcharts showing processing procedures of the learning and the correction performed by the microcomputer 31 in the present embodiment. The hardware constructions of the sensor device 20 and the like according to the present embodiment are the same as those of the above-described first embodiment shown in FIG. 1.

First in S30, the fuel temperature sensing values To#1, To#2, To#3, To#4 outputted from the respective fuel temperature sensors 23 of all the cylinders #1 to #4 are obtained sequentially. For example, as shown in FIG. 8A, the fuel temperature sensing values are sequentially obtained at respective predetermined times in the order of To#1, To#3, To#4 and To#2 corresponding to a combustion order of the cylinders (i.e., order of #1, #3, #4 and #2).

Figure 8A:
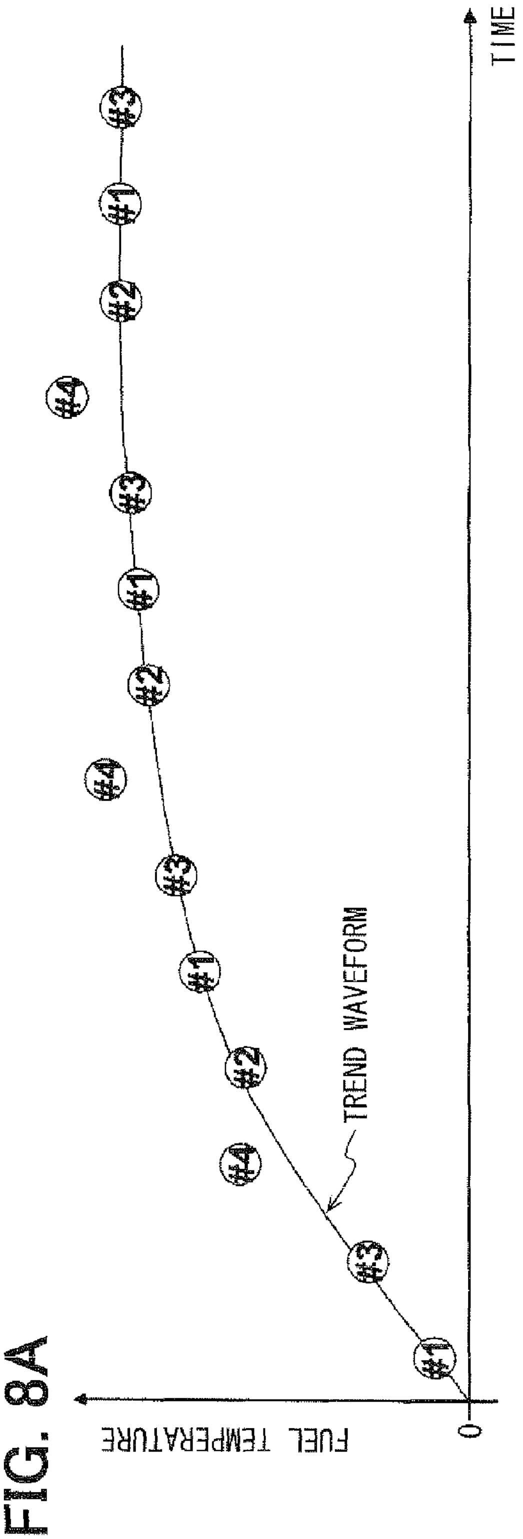
FIG. 8A is a diagram showing a trend waveform calculated by the learning processing according to the third embodiment.
Figure 8B:
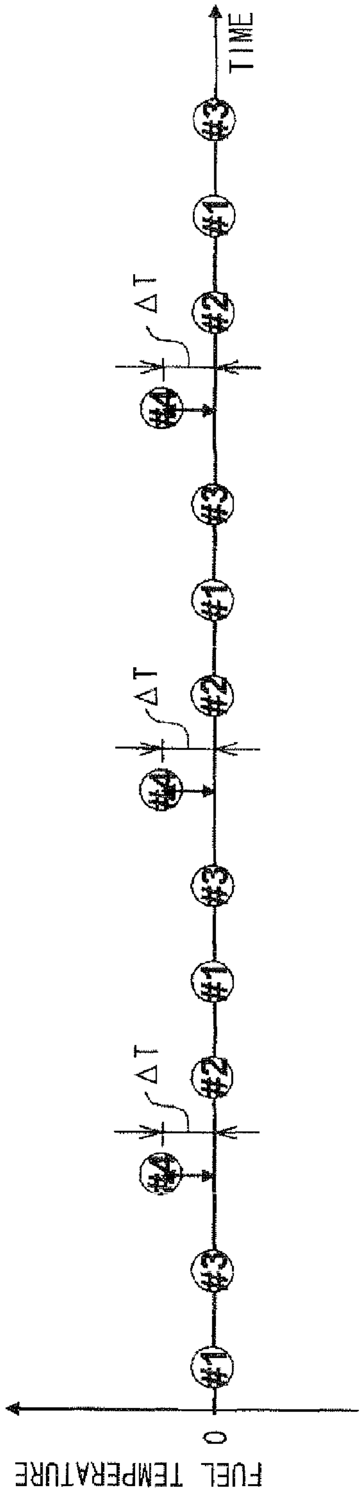
FIG. 8B is a diagram showing a result of removal of the trend waveform according to the third embodiment.

In following S31 (trend calculating section), a trend waveform shown by a solid line in FIG. 8A is calculated based on the fuel temperature sensing values To#1 to To#4 sequentially obtained at respective predetermined times. In following S32 (deviation calculating section), the values of the trend waveform calculated in S31 are subtracted from the fuel temperature sensing values To#1 to To#4 obtained in S30, thereby removing the trend waveform. That is, the differences between the fuel temperature sensing values To#1 to To#4 and the values of the trend waveform are calculated as deviation amounts ΔT with respect to the trend waveform. In the example of FIGS. 8A and 8B, the fuel temperature sensing value To#4 corresponding to the cylinder #4 has deviated from the trend waveform. Therefore, correction of an instrumental error variation of the fuel temperature sensor 23 of the cylinder #4 is necessary. The deviation amount ΔT corresponds to deviation and also to a correction amount.

In following S33 (abnormality determining section), it is determined whether an absolute value of the deviation amount ΔT calculated in S32 is "equal to or larger than" a predetermined value, which is set beforehand. If the absolute value of the deviation amount ΔT is equal to or larger than the predetermined value, a diagnostic signal indicating that the fuel temperature sensor 23 of the corresponding cylinder is abnormal is outputted in following S34.

If the absolute value of the deviation amount ΔT is smaller than the predetermined value, the processing proceeds to S35 (learning section). In S35, the deviation amount ΔT calculated in S32 is stored and updated in a memory such as EEPROM of the ECU 30, thereby learning the deviation amount ΔT.

A series of the above-described processing of FIG. 7A is learning processing performed once or several times when none of the injectors 10 of the cylinders injects the fuel (for example, immediately after occupant switches on ignition switch). The processing of FIG. 7B is repeatedly performed in a predetermined cycle (for example, computation cycle of CPU of microcomputer 31) while the internal combustion engine is operated.

That is, first in S36, the learning value (deviation amount ΔT) stored and updated by the above-described learning processing is read. In following S37 (correcting section), the fuel temperature sensing value To#4 transmitted sequentially through the signal line 15*b* is corrected based on the read deviation amount ΔT. That is, the fuel temperature sensing value T#4 after the correction is calculated by a formula: T#4=To#4−ΔT. Also the fuel temperature sensing values T#1 to T#3 of the other cylinders #1 to #3 are calculated by the similar correction if the deviation amounts are not zero.

The fuel temperature sensing values T#1 to T#4 corrected by the above processing are used for performing the above-mentioned temperature compensation and for calculating the injection rate waveform of part (b) of FIG. 2 from the fuel pressure waveform of part (c) of FIG. 2. Since the fuel pressure waveform turns into the different waveforms depending on the fuel temperature (INJ fuel temperature) in the injection hole 11*b* injecting the fuel at that time, it is required to calculate the injection rate waveform by correcting the fuel pressure waveform based on the INJ fuel temperature. The corrected fuel temperature sensing values T#1 to T#4 are used as the INJ fuel temperatures.

Thus, effects similar to the effects (1), (2) and (4) to (6) of the first embodiment can be exerted also by the third embodiment explained above.

Fourth Embodiment

Next, a fourth embodiment of the present invention will be explained.

In the present embodiment, when the difference among the actual fuel temperatures of the respective cylinders is sensed, the fuel temperature sensing values of the fuel temperature sensors 23 are not used. Rather, the fuel pressure sensing values of the respective fuel pressure sensors 22 are used. Thus, the fuel temperature sensors 23 can be rendered unnecessary. Also, when the fuel temperature sensing signal cannot be outputted since the output of the fuel pressure sensing value from the sensor device 20 is prioritized, the difference among the fuel temperatures of the cylinders can be sensed.

Hereafter, a sensing method performed by the microcomputer 31 will be explained. The hardware constructions of the sensor device 20 and the like according to the present embodiment are the same as those of the above-described first embodiment shown in FIG. 1. Alternatively, the fuel temperature sensors 23 may be abolished as mentioned above.

First, the fuel pressure sensing values Tp#1 to Tp#4 outputted from the respective fuel pressure sensors 22 of all the cylinders #1 to #4 are obtained. The values transmitted through the signal lines 15*b* at the same timing are used as the fuel pressure sensing values Tp#1 to Tp#4. It is preferable to use the values transmitted when none of the injectors 10 of the cylinders injects the fuel (for example, immediately after ignition switch is switched on).

Figure 9:
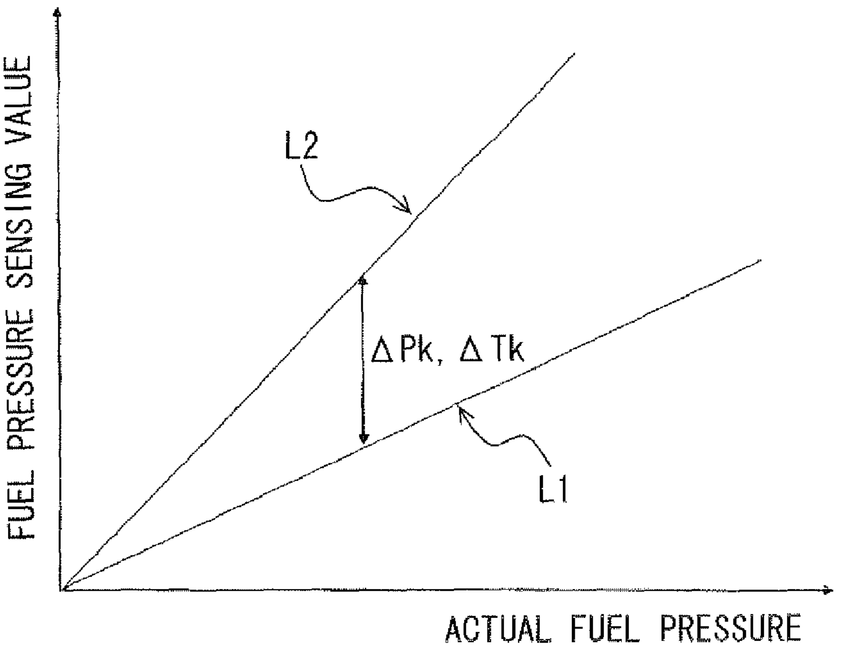
FIG. 9 is a diagram showing detection of a difference among actual fuel temperatures of respective cylinders according to a fourth embodiment of the present invention.

Then, an average value Pave of all the obtained fuel pressure sensing values Tp#1 to Tp#4 is calculated. The microcomputer 31 at the time when performing the calculation is equivalent to a fuel pressure average value calculating section. A solid line L1 in FIG. 9 shows a relationship between the actual fuel pressure (horizontal axis) and the fuel pressure average value Pave (vertical axis).

Then, differences ΔPk between the obtained fuel pressure sensing values Tp#1 to Tp#4 and the average value Pave are calculated respectively (ΔPk=Pave−Tp#1, Tp#2, Tp#3, Tp#4). A solid line L2 in FIG. 9 shows a relationship between the actual fuel pressure (horizontal axis) and the fuel pressure sensing value (vertical axis) of a certain cylinder (for example, cylinder #4). The difference ΔPk is equivalent to a fuel pressure sensing value deviation amount. The microcomputer 31 at the time when performing the calculation of the difference ΔPk is equivalent to a deviation calculating section.

Then, a temperature deviation amount between the actual fuel temperature corresponding to the cylinder #4 and the actual fuel temperature corresponding to the other cylinders #1 to #3 is calculated based on the calculated difference ΔPk. When an absolute value of the difference ΔPk is equal to or larger than a predetermined value, it is determined that the fuel pressure sensor 22 of the corresponding cylinder is abnormal.

The actual fuel pressure at the time when the fuel is not injected should be the same in all the cylinders. However, each fuel pressure sensor 22 has a temperature characteristic. Therefore, even when the fuel pressure is the same, the fuel pressure sensing values Tp#1 to Tp#4 take different values depending on the fuel temperature at the time.

That is, if the fuel temperatures of the respective cylinders are the same, there should be no deviation between the fuel pressure average value Pave and the fuel pressure sensing value Tp#4 of the specific cylinder #4 when the fuel is not injected. Therefore, when there occurs the deviation (difference ΔPk) between the fuel pressure average value Pave and the fuel pressure sensing value Tp#4 as shown in FIG. 9, it is thought that the deviation is caused by the difference in the fuel temperature of the cylinder #4. Therefore, when the difference between the fuel temperature of the cylinder #4 and the fuel temperature of the other cylinders #1 to #3 is defined as the temperature deviation amount ΔTk, it is assumed that the temperature deviation amount ΔTk is proportional to the difference ΔPk. The temperature deviation amount ΔTk is calculated based on the difference ΔPk.

Thus, according to the present embodiment, the temperature deviation amount ΔTk can be calculated without using the fuel temperature sensors 23.

Other Embodiments

The present invention is not limited to the above-described embodiments but may be modified and implemented as follows, for example. Further, characteristic constructions of the respective embodiments may be combined arbitrarily.

In the above-described third embodiment, the fuel temperature sensing values To#1, To#2, To#3, To#4 are sequentially obtained in the order of the arrangement of the cylinders. Alternatively, the fuel temperature sensing values To#1, To#3, To#4, To#2 may be obtained in the order of the fuel injection (i.e., in the order of #1, #3, #4 and #2).

In the above-described first embodiment, the learning processing of FIG. 4A is performed immediately after the switching-on operation of the ignition switch is performed. The learning timing of the present invention is not limited thereto. Alternatively, for example, the learning processing may be performed while the vehicle is running. Further, the learning processing of FIG. 4A may be performed every time the vehicle runs a predetermined distance.

In the above-described first embodiment, the fuel temperature average value Tave is calculated using the fuel temperature sensing values Ts#1 to Ts#4 transmitted through the signal lines 15*b* at the same timing. Alternatively, the fuel temperature average value Tave may be calculated using the fuel temperature sensing values transmitted at different timings.

In the above-described second embodiment, when the switching between the pressure sensing signal and the temperature sensing signal is commanded with the switching command signal, the same command content is transmitted to the multiple sensor devices 20 of the same group. Alternatively, different command contents may be transmitted to the multiple sensor devices 20 of the same group. For example, the switching command signal for causing the sensor device 20 (#1) to switch to the pressure sensing signal and for causing the sensor device 20 (#2) to switch to the temperature sensing signal may be transmitted to both of the sensor devices 20 (#1, #2) of the first group shown in FIG. 5.

In the above-described embodiments, the sensor device 20 is mounted to the injector 10. The arrangement of the sensor device 20 according to the present invention is not limited to such the arrangement. Other arrangement may be employed if the sensor device 20 is provided at the position closer to the injection hole 11*b* than to the common rail 42 in the fuel passage extending from the common rail 42 to the injection hole 11*b*. For example, the sensor device 20 may be arranged in an inlet portion of the high-pressure passage 11*a* in the body 11 of the injector 10. Alternatively, the sensor device 20 may be arranged in a pipe extending from the common rail 42 to the injector 10. Alternatively, the sensor device 20 may be arranged in a fuel outlet of the common rail 42.

The above-described correcting section S17 or S37 performs the correction for reducing the differences ΔT#1 to ΔT#4 from the average value Tave or the deviation amount ΔT as the deviation to zero. Alternatively, instead of completely reducing the deviation to zero, the correction may be performed by weighting the deviation.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel temperature sensing device applied to an internal combustion engine having injectors provided in respective cylinders for injecting fuel, which is distributed from a pressure accumulator, from injection holes, the fuel temperature sensing device comprising:

a plurality of fuel temperature sensors provided to the respective cylinders for sensing fuel temperature, wherein each of the fuel temperature sensors is arranged in a position closer to the injection hole than to the pressure accumulator in a fuel passage extending from the pressure accumulator to the injection hole;

an average value calculating means for calculating an average value of fuel temperature sensing values sensed with the fuel temperature sensors of the respective cylinders;

a deviation calculating means for calculating deviations between the average value and the fuel temperature sensing values of the respective fuel temperature sensors; and a correcting means for correcting the fuel temperature sensing value of each of the fuel temperature sensors to approximate the deviation to zero for each of the fuel temperature sensors.

2. The fuel temperature sensing device as in claim 1, wherein the average value calculating means calculates the average value of the fuel temperature sensing values obtained from the fuel temperature sensors of all the cylinders.

3. The fuel temperature sensing device as in claim 1, wherein the fuel temperature sensors are grouped into a plurality of groups, and the average value calculating means calculates the average value of the fuel temperature sensing values for each group.

4. The fuel temperature sensing device as in claim 1, wherein the average value calculating means calculates the average value of the fuel temperature sensing values, which are sensed with the plurality of fuel temperature sensors at the same timing.

5. The fuel temperature sensing device as in claim 1, further comprising:

a determining means for determining that certain one of the fuel temperature sensors is abnormal when the deviation of the certain one of the fuel temperature sensors is equal to or larger than a predetermined value.

6. The fuel temperature sensing device as in claim 1, further comprising:

a learning means for learning a correction amount used by the correcting means during a stoppage of the internal combustion engine having the injectors.

7. The fuel temperature sensing device as in claim 1, wherein the internal combustion engine having the injectors is mounted in a vehicle, and the learning means performs the learning of the correction amount, which is used by the correcting means, for each predetermined travel distance of the vehicle.

8. A fuel temperature sensing device applied to an internal combustion engine having injectors provided in respective cylinders for injecting fuel, which is distributed from a pressure accumulator, from injection holes, the fuel temperature sensing device comprising:

a plurality of fuel temperature sensors provided to the respective cylinders for sensing fuel temperature, wherein each of the fuel temperature sensors is arranged in a position closer to the injection hole than to the pressure accumulator in a fuel passage extending from the pressure accumulator to the injection hole;

a trend calculating means for calculating a trend waveform showing a tendency of a temporal transition of fuel temperature sensing values sensed with the fuel temperature sensors;

a deviation calculating means for calculating a deviation between the trend waveform and the fuel temperature sensing value for each of the fuel temperature sensors; and a correcting means for correcting the fuel temperature sensing value to approximate the fuel temperature sensing value to the trend waveform for each of the fuel temperature sensors.

9. The fuel temperature sensing device as in claim 8, wherein the trend calculating means calculates the trend waveform by using the fuel temperature sensing values obtained from the fuel temperature sensors of all the cylinders.

10. The fuel temperature sensing device as in claim 8, wherein the fuel temperature sensors are grouped into a plurality of groups, and the trend calculating means calculates the trend waveform of the fuel temperature sensing values for each group.

11. The fuel temperature sensing device as in claim 8, wherein the fuel temperature sensing values used for calculating the trend waveform are sequentially obtained from the plurality of fuel temperature sensors.

12. The fuel temperature sensing device as in claim 8, further comprising:

a determining means for determining that certain one of the fuel temperature sensors is abnormal when the deviation of the certain one of the fuel temperature sensors is equal to or larger than a predetermined value.

13. The fuel temperature sensing device as in claim 8, further comprising:

a learning means for learning a correction amount used by the correcting means during a stoppage of the internal combustion engine having the injectors.

14. The fuel temperature sensing device as in claim 8, wherein the internal combustion engine having the injectors is mounted in a vehicle, and the learning means performs the learning of the correction amount, which is used by the correcting means, for each predetermined travel distance of the vehicle.

* * * * *